US010719230B2

United States Patent
Bar-on

(10) Patent No.: US 10,719,230 B2
(45) Date of Patent: Jul. 21, 2020

(54) RECOGNITION AND PROCESSING OF GESTURES IN A GRAPHICAL USER INTERFACE USING MACHINE LEARNING

(71) Applicants: Atlassian Pty Ltd, Sydney New South Wales (AU); Atlassian, Inc., San Francisco, CA (US)

(72) Inventor: Noam Bar-on, Mountain View, CA (US)

(73) Assignees: Atlassian Pty Ltd, Sydney (AU); Atlassian, Inc., San Francisco, CA (US)

( * ) Notice: Subject to any disclaimer, the term of this patent is extended or adjusted under 35 U.S.C. 154(b) by 0 days.

(21) Appl. No.: 16/298,756

(22) Filed: Mar. 11, 2019

(65) Prior Publication Data

US 2020/0104037 A1 Apr. 2, 2020

Related U.S. Application Data

(60) Provisional application No. 62/737,227, filed on Sep. 27, 2018.

(51) Int. Cl.
*G06F 3/0488* (2013.01)
*G06N 3/08* (2006.01)
*G06F 3/041* (2006.01)
*G06F 3/0482* (2013.01)

(52) U.S. Cl.
CPC ........ *G06F 3/04883* (2013.01); *G06F 3/0416* (2013.01); *G06F 3/0482* (2013.01); *G06N 3/08* (2013.01)

(58) Field of Classification Search
CPC .. G06F 3/04883; G06F 3/0416; G06F 3/0482; G06N 3/08
See application file for complete search history.

(56) References Cited

U.S. PATENT DOCUMENTS

| 5,745,116 | A | * | 4/1998 | Pisutha-Arnond | ........................... G06F 3/04883 715/863 |
|---|---|---|---|---|---|
| 2009/0006292 | A1 | * | 1/2009 | Block | ................. G06F 3/04883 706/20 |
| 2011/0307840 | A1 | * | 12/2011 | Harris | ................. G06F 3/04847 715/863 |
| 2014/0040756 | A1 | * | 2/2014 | Bukurak | ................. G06F 3/017 715/741 |
| 2014/0143738 | A1 | * | 5/2014 | Underwood, IV | ...... H04L 51/38 715/863 |

(Continued)

*Primary Examiner* — Andrew T Chiusano
(74) *Attorney, Agent, or Firm* — Hickman Palermo Becker Bingham LLP

(57) ABSTRACT

In an embodiment, a computer-implemented method comprises: displaying a continuous content stream of individually actionable content items; automatically recognizing, while the continuous content stream is being displayed, a mode change from a control mode to a signal mode; receiving a touch input after the mode change is recognized and, in response, using a neural network to generate output data indicating a gesture classification for the touch input, wherein the touch input is received in relation to a particular actionable content item that is in a visible portion of the continuous content stream; performing, according to the output data, an action for the particular actionable content item; wherein the method is performed by one or more computing devices.

16 Claims, 7 Drawing Sheets

(56) References Cited

U.S. PATENT DOCUMENTS

| | | | |
|---|---|---|---|
| 2014/0189482 A1* | 7/2014 | Hill | G06F 3/04883 |
| | | | 715/212 |
| 2017/0068854 A1* | 3/2017 | Markiewicz | G06K 9/00416 |
| 2017/0285931 A1* | 10/2017 | Duhon | G06F 3/04847 |
| 2019/0347057 A1* | 11/2019 | Segarra, Jr. | G06F 3/0488 |

* cited by examiner

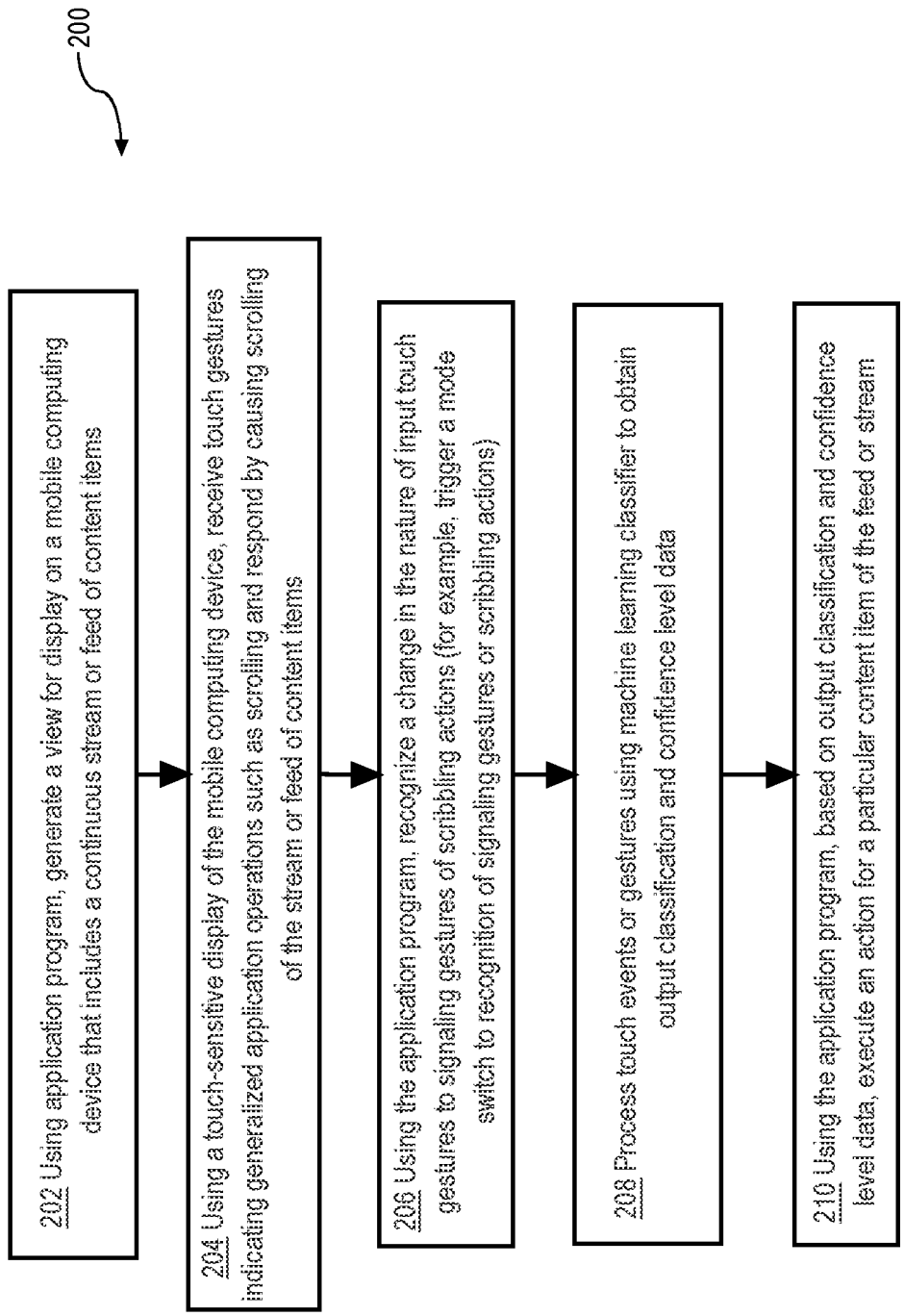

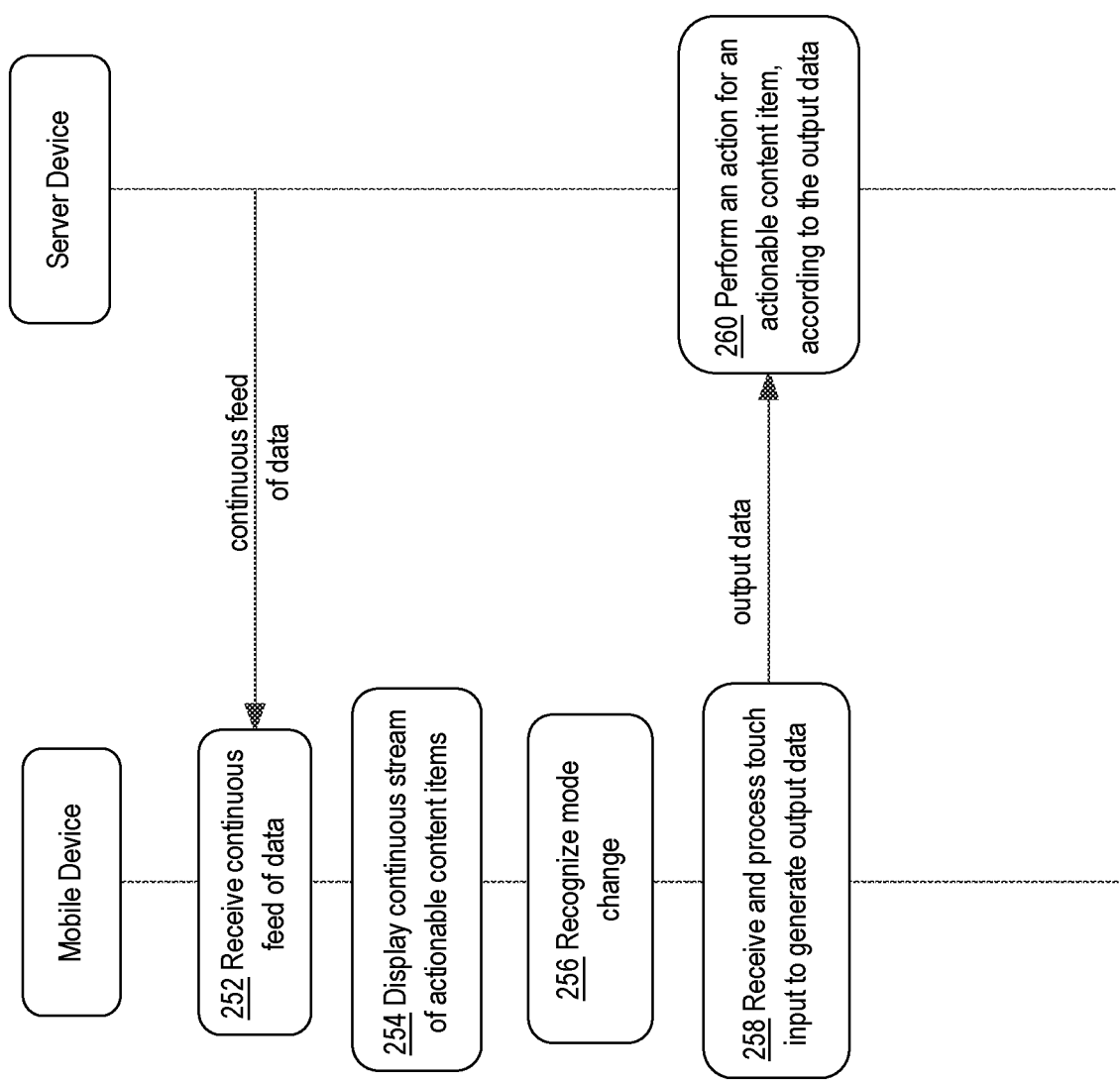

RECOGNITION AND PROCESSING OF GESTURES IN A GRAPHICAL USER INTERFACE USING MACHINE LEARNING

BENEFIT CLAIM

This application claims the benefit under 35 U.S.C. § 119(e) of provisional application 62/737,227, filed Sep. 27, 2018, the entire contents of which is hereby incorporated by reference as if fully set forth herein.

FIELD OF THE DISCLOSURE

One technical field of the present disclosure is computer-implemented graphical user interfaces. Another technical field is computer-implemented recognition of gestures applied to touch-screen computer displays. Yet another technical field is computer-implemented machine learning algorithms such as classifiers.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Mobile computing devices and other computers now are commonly provided with touch-sensitive digital graphical displays. These displays use arrays of transparent capacitive elements that detect a change in applied voltage when physical touch pulls an element to ground potential. User input to application programs, utility services and other software can be provided by tapping, dragging, or drawing simple gestures on the screen. Typically, such gestures consist of a swipe, pinch, reverse pinch and other one- or two-finger movements.

However, to date, gesture recognition software has been incapable of recognizing a large vocabulary of more complex gestures. The recognition of a complex gesture requires simultaneous or near-simultaneous detection of contact with multiple different points on a screen, and identification of multiple vectors representing movement of fingers. Continuous monitoring of a dense display screen for these contact points may require more processing power than an operating system is designed to allocate to the task. Furthermore, gesture recognition services usually have been provided via operating system libraries that are not easily adaptable to special-purpose gestures that particular application programs may need or benefit from.

Thus, what is needed is a more sophisticated and flexible gesture recognition process that can enable different computer program applications to receive input via complex gestures that may be application-specific.

SUMMARY

The appended claims may serve as a summary of the invention.

BRIEF DESCRIPTION OF THE DRAWINGS

FIG. 2A illustrates an example computer-implemented method that may be used to govern the operation of a content management system, according to an embodiment.

FIG. 2B illustrates an example event flow within a content management system, in one embodiment.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein in sections according to the following outline:

| | |
|---|---|
| 1.0 | GENERAL OVERVIEW |
| 2.0 | STRUCTURAL OVERVIEW |
| 3.0 | PROCEDURAL OVERVIEW |
| 4.0 | HARDWARE OVERVIEW |
| 5.0 | GRAPHICAL USER INTERFACE IMPLEMENTATIONS |
| 6.0 | OTHER ASPECTS OF DISCLOSURE |

\*

1.0 General Overview

According to various embodiments, computer-implemented methods and systems are provided for automatically recognizing signaling gestures that are more complex than control gestures. Past approaches required a graphical button, toggle, or switch and a preliminary action, such as a tap on the GUI element to signal a change between interacting in one programmatic function such as scrolling and interacting in another programmatic function such as marking a content item via a signaling gesture. However, the present approach provides automatic recognition of control gestures and signaling gestures that are interleaved with control gestures without a need to additionally display a GUI element that is separate from content being displayed, advantageously leaving an entire display area available for content.

In an embodiment, a computer-implemented method comprises displaying a continuous content stream of individually actionable content items. The method further comprises automatically recognizing, while the continuous content stream is being displayed, a mode change from a control mode to a signal mode. The method further comprises receiving a touch input after the mode change is recognized and, in response, using a neural network to generate output data indicating a gesture classification for the touch input. The touch input is received in relation to a particular actionable content item that is in a visible portion of the continuous content stream. The method further comprises performing, according to the output data, an action for the particular actionable content item. The method is performed by one or more computing devices.

Other features, aspects and embodiments will become apparent from the disclosure as a whole including the drawings and claims.

2.0 Structural Overview

Figure 1:
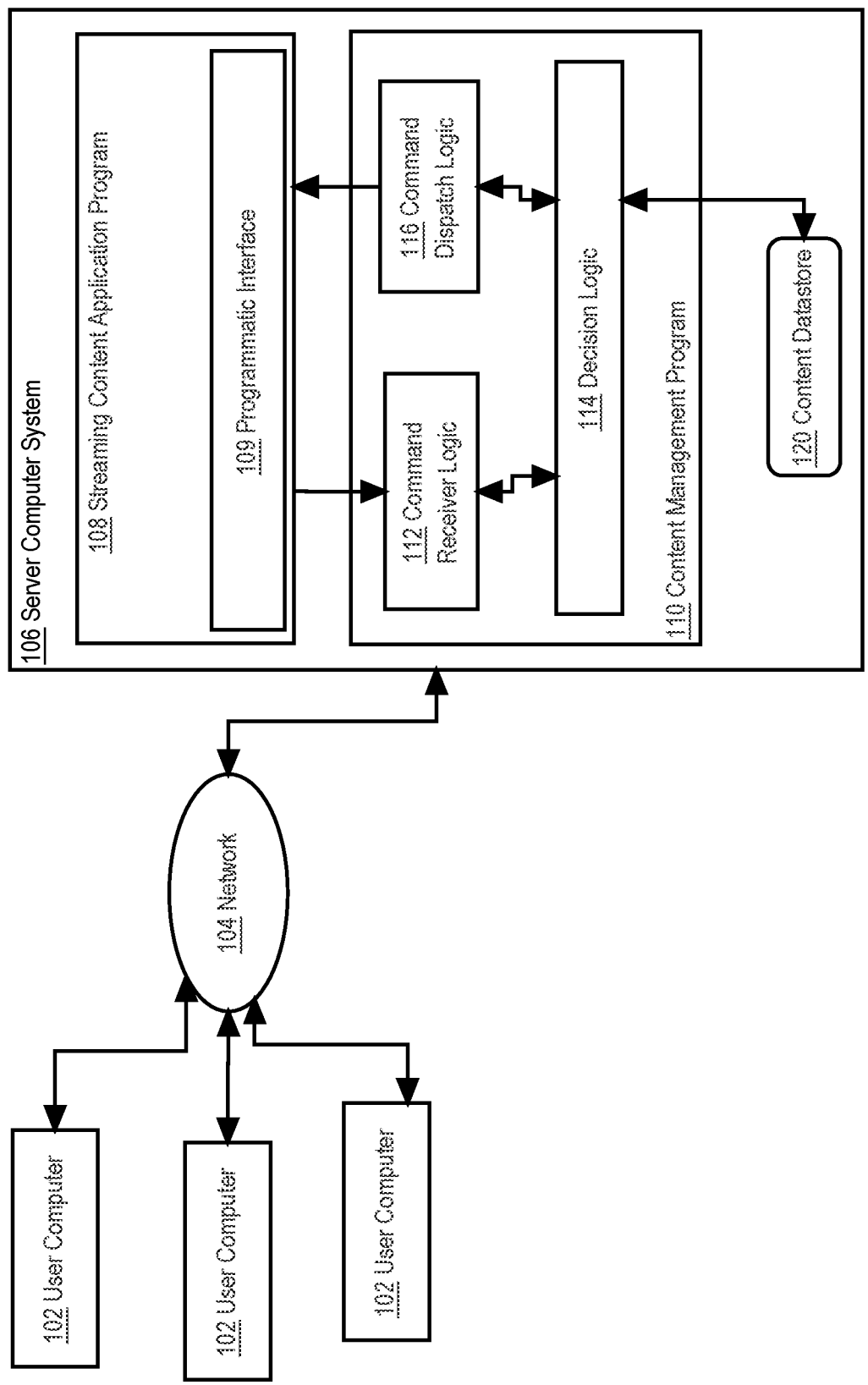
FIG. 1 illustrates an example computer system, according to an embodiment.

FIG. 1 illustrates a computer system that may be used to implement an embodiment of a content management system. In the example of FIG. 1, a plurality of user computers 102 are coupled via network 104 to a server computer system 106. Any number of user computers 102 may be used and three (3) are shown in FIG. 1 merely for purposes of providing an illustrative example. Each user computer 102 may comprise a mobile computing device, desktop computer, laptop computer or other end station. Each user computer 102 is capable of receiving input via a keyboard, pointing device or other input-output device, has a visual data display device, and one or more network interfaces that are capable of communication with network 104. In one embodiment, each user computer 102 executes at least an operating system and a web browser application program that is capable of receiving, rendering and causing display of pages based upon structured markup language code or instructions in HTML, XML or similar languages. The installation of application-specific client software on a user computer 102 is not required and an embodiment may use a browser to communicate with a compatible HTTP server at the server computer 106.

The network 104 broadly represents any combination of one or more local area networks, wide area networks, campus networks and/or internetworks. Packet-switched networks may be used with networking infrastructure devices such as switches and routers that are programmed to communicate packet data based on internet protocol (IP), a transport protocol such as TCP or UDP, and higher-order protocols at any of several different logical layers, such as those defined by the Open Systems Interconnect (OSI) multi-layer internetworking model.

Server computer system 106 may comprise one or more cores, processors, computers, and/or virtual machine instances hosted on the premises of an enterprise or using a public or private cloud computing facility.

In an embodiment, server computer system 106 hosts or executes a streaming content application program 108, which is illustrated as a single functional element in FIG. 1 but may be organized using a plurality of different computer programs, processes or other software elements. The streaming content application program 108 is a computer-executed system that manages a plurality of content feeds or streams of electronic documents, alerts, notifications and messages associated with different user accounts. In an embodiment, such content items may be from a plurality of sources.

The streaming content application program 108 is programmed or configured to process functions for the creation and management of a plurality of different user accounts, consisting of a set of user credentials that may be used to access the system using one of the user computers 102. Each user account comprises a record in a datastore that associates a unique handle, identifier or name; a screen name or display name; credentials such as an e-mail address and password; and other metadata relating to an account. Handles or account identifiers may be denoted by a character tag such as "@" and the use of a handle in a content item implies that the corresponding account is being addressed. An example of a handle is @jameskirk with a corresponding screen name or display name of "James Kirk."

The streaming content application program 108 is programmed for receiving messages, such as but not limited to short messages consisting of text and links or other media attachments, and transmitting those messages only to user accounts that are then-currently associated with a specified particular stream or feed, via the credentials of the user account. In one embodiment, streaming content application program 108 is the CONFLUENCE cloud-based team business communication and collaboration tool, commercially available from Atlassian Pty Ltd., Sydney, Australia.

In an embodiment, the streaming content application program 108 is communicatively coupled using a programmatic interface 109 to a content management program 110 having command receiver logic 112, decision logic 114, command dispatch logic 116, and a content datastore 120. Other embodiments may use different internal organizational arrangements to implement functionally equivalent computer operations. In an embodiment, programmatic interface 109 comprises executable code that is responsive to calls from command dispatch logic 116, the calls defined using an application programming interface (API). In an embodiment, programmatic interface 109 comprises executable code that is capable of transmitting notifications about content items to the command receiver logic 112.

In some embodiments, the command receiver logic 112 is programmed to receive commands or instructions to define streams, feeds or content items, such as a document name or identifier, data regarding projects or teams to associate with the content item, and/or filter information for further narrowing content from various sources, such as other user accounts, to appear in feeds.

In an embodiment, decision logic 114 is programmed to evaluate commands or instructions that have been obtained through the command receiver logic 112 to create requested content items and/or to determine what content, announcements, messages, or other transmissions to output in a particular feed or stream of the streaming content application program 108 for a particular user account. In an embodiment, command dispatch logic 116 is programmed to receive the content, announcements, messages, or other transmissions to output in a feed or stream.

In other embodiments, the user computer(s) 102 are configured to include one or more of components 108, 109, 110, 112, 114, 116, 120 of the server computer system 106, or are otherwise configured to perform corresponding functionality.

3.0 Procedural Overview

FIG. 2A illustrates an example method that may govern the operation of a content management system, in one embodiment. Method 200 includes operations, functions, and/or actions as illustrated by blocks 202-210. For purposes of illustrating a clear example, the method of FIG. 2A is described herein with reference to execution using certain elements of FIG. 1; however, FIG. 2A may be implemented in other embodiments using computing devices, programs or other computing elements different than those of FIG. 1. Further, although the blocks 202-210 are illustrated in order, the blocks may also be performed in parallel, and/or in a different order than described herein. The method 200 may also include additional or fewer blocks, as needed or desired. For example, the blocks 202-210 can be combined into fewer blocks, divided into additional blocks, and/or removed based upon a desired implementation.

FIG. 2A may be implemented using one or more computer programs or other software elements organized as sequences of instructions stored on computer-readable storage media. FIG. 2A, and each other flow diagram or other process description in this disclosure, is described at the same level of detail as ordinarily used by persons of skill in the computing arts to communicate among one another about the functional steps to be realized in computer programs that may include far more methods, objects, subroutines, or instructions than specifically indicated in FIG. 2A; the development, deployment, testing and debugging of functional programs is deemed to be within the high level of skill in the art to which this disclosure pertains.

In addition, each block 202-210 may represent a module, a segment, or a portion of program code that includes one or more instructions executable by a processor for implementing specific logical functions or operations. The program code may be stored on any type of computer-readable medium or storage device including a disk or hard drive, for example. The computer-readable medium may include a non-transitory computer-readable medium, such as computer-readable media that stores data for short periods of time like register memory, processor cache, and Random Access Memory (RAM). The computer-readable medium may also include non-transitory media, such as secondary or persistent long term storage, like read only memory (ROM), optical or magnetic disks, compact-disc read only memory (CD-ROM), etc. The computer-readable medium may also include any other volatile or non-volatile storage systems. The computer-readable medium may be considered a computer-readable storage medium, for example, or a tangible storage device. In addition, one or more of blocks 202-210 may represent circuitry that is configured to perform the logical functions and operations of method 200.

The method 200 begins at step 202, in which an application program generates a view, for example in a web browser application executing in a mobile computing device, that contains a continuous stream of content. Example application programs include collaborative business communication applications, social networking applications, chat room systems and others. In these application programs, a view typically comprises a continuous feed of content items. Individual content items may comprise messages, comments, notifications or alerts, indications that electronic documents were created or can be accessed, and so forth.

At step 204, the application program recognizes human touch gestures on a touch-sensitive display that indicate scrolling the display, typically in two directions such as up and down or side to side. The screen display of any known mobile computing device is capable of displaying a finite amount of content bounded by the physical dimensions of the screen, but a typical stream or feed of content is much larger or extensive and not all the content will fit on the screen. By recognizing touch screen gestures indicating scrolling, in response, the application program may retrieve and display content items that occur later or earlier than the content items that are then currently shown in a visible portion of a feed or stream of content.

At step 206, the application program recognizes a change in the nature of input gestures from general application controls, such as scrolling, to signaling gestures or scribbling actions that represent input to be processed in relation to a particular content item. For example, in some embodiments, the application program can recognize a check mark, approval mark, LIKE mark, LOVE mark or heart symbol, X mark or deletion symbol and so forth.

Recognition of these more complex gestures may include calling or invoking a neural network and/or machine learning program or service, such as a classifier, to generate output data indicating a classification of a gesture with a confidence level value. A trained machine learning classifier may be used that has been trained on training data representing input of a variety of different complex gestures. In one embodiment, a labeled data set may be created or obtained. The labeled data set includes a variety of complex gestures and corresponding labels. A classification network is trained using TensorFlow with the labeled data, resulting in a model. The trained model is then exported to a targeted platform, such as CoreML and/or other inferencing technologies. An exported model may then run on a user computer, such as a mobile computing device.

Alternatively, or additionally, recognition of these more complex gestures may invoke an algorithm that considers gesture physics. For example, an opening acceleration at a beginning of a gesture, a closing deceleration at an end of the gesture, and a velocity in between may be used to differentiate the gesture from other gestures.

A step 208, the application program executes a particular kind of action for a particular content item in response to recognizing a particular signaling gesture or scribble for that particular content item. For example, a signaling gesture may consist of an X gesture over a particular content item; in response, the application program may be programmed to delete the content item or to mark the content item as dismissed. A check-mark gesture may result in marking a content item with an approval indication or LIKE value. A heart gesture may result in marking a content item with a strong approval indication. A question-mark gesture may result in communicating, to a user account that created or originated an associated content item, a request for further information about the content item. The specific actions executed for content items may vary from application to application and the foregoing are intended merely as examples. These content items are also referred to herein as actionable content items. Step 208 may execute only when a confidence level value, received at step 206 as part of recognition, exceeds a programmed threshold.

In some embodiments, the particular application in which embodiments are used will generate a display of information that is continuous and scrollable. Therefore, embodiments are programmed to recognize a scrolling gesture and respond by scrolling the application display, while concurrently recognizing a signaling gesture that may be interleaved with instances of the scrolling gesture and executing an application-specific function in response to the signaling gesture. In some embodiments, signaling gestures comprise check-mark gestures, "OK" gestures, "X" gestures, heart (♥) symbol or others. A signaling gesture typically is a scribble, rather than a control gesture such as a tap, swipe or pinch, and is at least somewhat more complex than a control gesture. Signaling gestures may indicate feedback for content that the application displays, such as approval, disapproval, dismissal or deletion and so forth.

In an embodiment, a programmed function of a mobile computing device generates a programmatic touch event in response to hardware elements detecting a touch on capacitive elements of the touch-sensitive display. The programmatic function may be implemented in an operating system, an operating system primitive, a library function, or natively in the application program.

The programmatic function executes recognition of a gesture, associates the gesture with the touch event, then transmits a programmatic message or "hit test" to one or more views that are then currently executing. In an embodiment, a frame of an application executing in a mobile device is organized as a hierarchical plurality of logical views, which represent display objects and contexts that may implement different functions. For example, a first view may execute to provide application functions such as a scrolling display and a second view may represent an object within the scrolling display such as a message, notification or other content.

The programmatic message queries the active views serially, according to a hierarchy of views, to determine whether any of the views are to process or handle the touch event in association with the recognized gesture. If the first view is queried to handle the touch event and replies with a negative response, then the programmatic function issues a query to the second view, and so on until a positive response is received from a view. For example, if the recognized gesture is a swipe, then the first view may reply with a negative response, indicating that the swipe cannot be processed, but the second view may reply with a positive response, indicating that the swipe can and will be processed.

In an embodiment, the application program registers, with the operating system, an event handler for all touch events within the frame associated with the application. When a touch event occurs and a programmatic message querying whether to handle the touch event is received, the application program responds in the affirmative. Next, the application program is programmed to wait for a small amount of time to receive other touch events and, if they are received, they are applied to a machine learning model or classified to determine if the other touch events indicate a signaling gesture. If the time ends and no other touch events are received, then the initial touch event is interpreted as a scrolling gesture.

In some embodiments, a touch event indicating holding a finger on the display screen for longer than 0.5 seconds is interpreted as a switch to a signaling gesture or scribble mode. In signaling or scribble mode, the application program is programmed to wait up to 2.5 seconds to receive other touch events and then determine using a machine learning model or classifier whether all the touch events indicate a signaling gesture or scribble. However, if no subsequent touch event is received in 1.5 seconds, then the application program reverts to scrolling mode and determines if the initial touch event represented a scrolling gesture.

This approach has the benefit that a preliminary action, such as a tap on a graphical switch or toggle, is not required to signal a change, to the software, between interacting with one programmatic function such as scrolling a display, and a second programmatic function such as marking a content item via a gesture. Instead, time windows are programmed to search for touch events that indicate different kinds of gestures and interactions. This approach improves efficiency of mobile computing device displays because graphical buttons, toggles, switches or other graphical change features do not need to be displayed and there is no need for memory management or programming of graphical user interface widgets to support such graphical buttons, toggles, switches or other graphical change features. Furthermore, more screen display area becomes available for content.

In another embodiment, whether a touch event is associated with a scroll operation or a signaling gesture is determined based upon an initial length of press on the screen. For example, the application program may be programmed to determine whether a touch event represents an initial length of press of less than or equal to 0.5 seconds, or greater than 0.5 seconds. If the touch event is for a press of 0.5 seconds or less, then the touch event indicates a tap on the screen or a scrolling gesture. If the touch event is for a press of greater than 0.5 seconds, then the touch event indicates a signaling gesture or scribble operation. Thereafter, the application program is programmed to expect other touch events that are associated with signaling gestures or scribbles.

In other embodiments, mode switching of the foregoing type may be signaled by means other than a press of a specified time. For example, other patterns of pressure or stroke may indicate a mode switch. Or, the application program could identify velocity of a gesture as a mode change signal.

In some embodiments, the foregoing process may be integrated with a per-user training period in which a mode switch triggers a visual, graphical prompt to the user computer to provide feedback about whether the mode switch was correctly interpreted. In response, user input with the mobile computing device may specify affirmative or negative to indicate whether a mode switch occurred correctly, and this data may be used to adapt future responses of the application program or service.

In some embodiments, the application program may be programmed to provide a visual indication that a mode switch was recognized. For example, a touch event indicating a long press or tap, such as longer than 0.5 seconds as described above, could trigger flashing a scroll bar, highlighting or changing a color of a view, frame, object or window, or other visual indication to provide feedback to a user that a signaling gesture or scribble is expected.

In some embodiments, the application program may be programmed to display, in response to changing mode to signaling or scribbling mode, examples of scribbles that can be performed. For example, example scribbles such as check marks, X marks, or other symbols may be visually displayed as overlays on content that the application program is otherwise displaying. This approach eliminates the need for active GUI widgets to implement buttons or other GUI elements and eliminates the need to occupy screen display area with such buttons or GUI elements, but still permits conveying information about possible actions that can be performed. Furthermore, in such embodiments, the application program may be programmed to start recognition of a particular kind of signaling gesture may when a particular one of the possible actions is tapped or touched.

Thus, embodiments provide programmed mechanisms to accept and implement a first logical layer of touch screen gestures to control display aspects such as scrolling content displayed by an application program, while separately and correctly concurrently recognizing a second logical layer of touch screen gestures that indicate more complex interaction with individual content items that are displayed. Both logical layers of gestures or touch controls are concurrently available within the same overall screen display without the use of specialized regions, areas, buttons or other graphical user interface elements. The application program, or a service of an operating system, or a library function, is programmed to determine what touch events indicate a change from the first logical layer of gestures to the second logical layer of gestures, and to interpret what specific gesture of each logical layer was performed. Thereafter, the application program or other services can correctly respond in different ways to the gestures of the different logical layers.

Embodiments are useful with application programs in the field of chat rooms, text messaging, social networking, professional team communications, news feeds and others.

In some embodiments, different application programs or views may be programmed to respond to different sets of signaling gestures or scribbles. That is, different views, from the same application program or different programs, may accept different signaling gestures to execute different functions. Furthermore, the machine learning model may be trained to classify or recognize any number of different signaling gestures and to output a classification decision with a confidence level for the different signaling gestures. No connection or binding between specific signaling gestures and views is required. Furthermore, different application programs may respond differently to the classification decisions based on the confidence level values. For example, a recognition of an "X" gesture with a 40% confidence level value may be sufficient for one application program to execute an action associated with an "X" gesture, and insufficient for a different application program.

In another embodiment, triggering a signaling gesture or scribble mode may be performed by anchoring a starting point; for example, each view may define a specified point at which a signaling gesture or scribble is expected to start, such as the lower center of the view, or some other point or sub region. The specified point is a starting point, rather than a bounding box or confinement region in which the entire gesture is required to appear. The gesture merely must start at a specified point or within a specified distance of a specified point, and otherwise there are no limits on the display area in which the complex gesture occurs. In this embodiment, any gesture that begins outside of the specified point is interpreted as a scroll or other generalized application control, rather than a signaling gesture or scribble associated with content. This approach would not require a long press or the 0.5 second test or trigger approach described above.

FIG. 2B illustrates an example event flow within a content management system, in one embodiment. The event flow 250 is between a mobile device and a server device. The mobile device may be similarly configured as the user computer 102 of FIG. 1, and the server device may be similarly configured as the server computer system 106 of FIG. 1. The mobile device may execute a web browser application program that is capable of receiving, rendering and causing display of pages based upon structured markup language code or instructions in HTML, XML or similar languages. The server device may execute a streaming content application program, such as CONFLUENCE from Atlassian Pty Ltd., Sydney, Australia.

At step 252, an application executing on the mobile device receives a continuous feed of data over a network from a streaming content application program executing on the server device. In an embodiment, the mobile device constructs individually actionable content items from the data. In another embodiment, the data feed may include individually actionable content items organized in a specific manner. The mobile device is equipped with a touchscreen.

In an embodiment, the individually actionable content items are for a particular user account, which may be associated with a user of the mobile device, and may be from a plurality of data sources, such as other user accounts and other programs. The individually actionable content items may include messages, comments, notifications or alerts, indications that electronic documents were created or can be accessed, and so forth. One or more actions may be performed on any of the content items displayed on the touchscreen.

At a step 254, the mobile device displays a continuous stream of individually actionable content items on the touchscreen of the mobile computing device throughout the following steps. Due to the physical dimensions of the touchscreen, a limited amount of content items may be displayed at a time. A visible portion of the continuous content stream may take up all of the touchscreen. The application program thus may operate in a control mode and respond to control gestures, such as vertical and horizontal scrolls. The application program, in response to recognized control gestures, may retrieve and display actionable content items that occur later or earlier than the actionable content items that are then currently shown in a visible portion of the continuous content stream.

At step 256, while the continuous content stream is being displayed at the mobile device, a mode change from the control mode to a signal mode is automatically recognized without a need to display or provide a distinct graphical menu, a button, a toggle, a switch, or another graphical change feature that is separate from and in addition to the continuous content stream being displayed at the mobile device.

In an embodiment, automatically recognizing a mode change may involve receiving a touch event indicating a screen press for a predetermined amount of time. For example, a finger press on the touchscreen for longer than 0.5 seconds may be interpreted as a mode change. The application program may then expect subsequent inputs associated with signaling gestures until the next mode change.

In another embodiment, automatically recognizing a mode change may involve determining whether a start of a touch input is within a predetermined distance from a starting point predefined for a display view. In this embodiment, any touch input outside of this distance from the starting point may be interpreted as control gestures.

While the control mode enables interaction with display controls, such as vertical scrolling and horizontal scrolling, the signal mode enables interaction with at least one of the actionable content items. In an embodiment, the application program may provide a visual indication to indicate to the user that the mode change is recognized. For example, one or more scroll bars may start flashing, or a view may be highlighted.

At step 258, the mobile device receives a touch input from the touchscreen and, in response, processes the touch event to generate output data indicating a gesture classification for the touch input. The touch input is received in relation to a particular actionable content item that is in a visible portion of the continuous content stream at the mobile device. In an embodiment, the touch input from 258 may be the same touch input from the step 256.

In an embodiment, the output data may be generated using a neural network, which may be trained to classify any number of different signaling gestures and to output a classification decision with a confidence level for the different signaling gestures.

At step 260, the application program performs an action for the particular actionable content item, according to the output data. For example, when the touch input is a signaling gesture consisting of an X gesture, then the action may be marking or otherwise associating a dismissal indication with the particular actionable content item. In an embodiment, the dismissed content item may be deleted from the continuous content stream. For another example, when the touch input is a signaling gesture consisting of a check-mark gesture, then the action may be marking or otherwise associating an approval indication with the particular actionable content item. For yet another example, when the touch input is a signaling gesture consisting of a heart gesture, then the action may be marking or otherwise associating a strong approval indication with the particular actionable content item. For yet another example, when the touch input is a signaling gesture consisting of a question-mark gesture, then the action may be requesting communication with a user account associated with the particular actionable content item. Specific actions executed for content items may vary from application to application.

Although FIG. 2B has been described with reference to a continuous of content stream over a network, it will be appreciated that the techniques described herein may be implemented in different environments that do not include continuous content, items, or a network.

4.0 Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
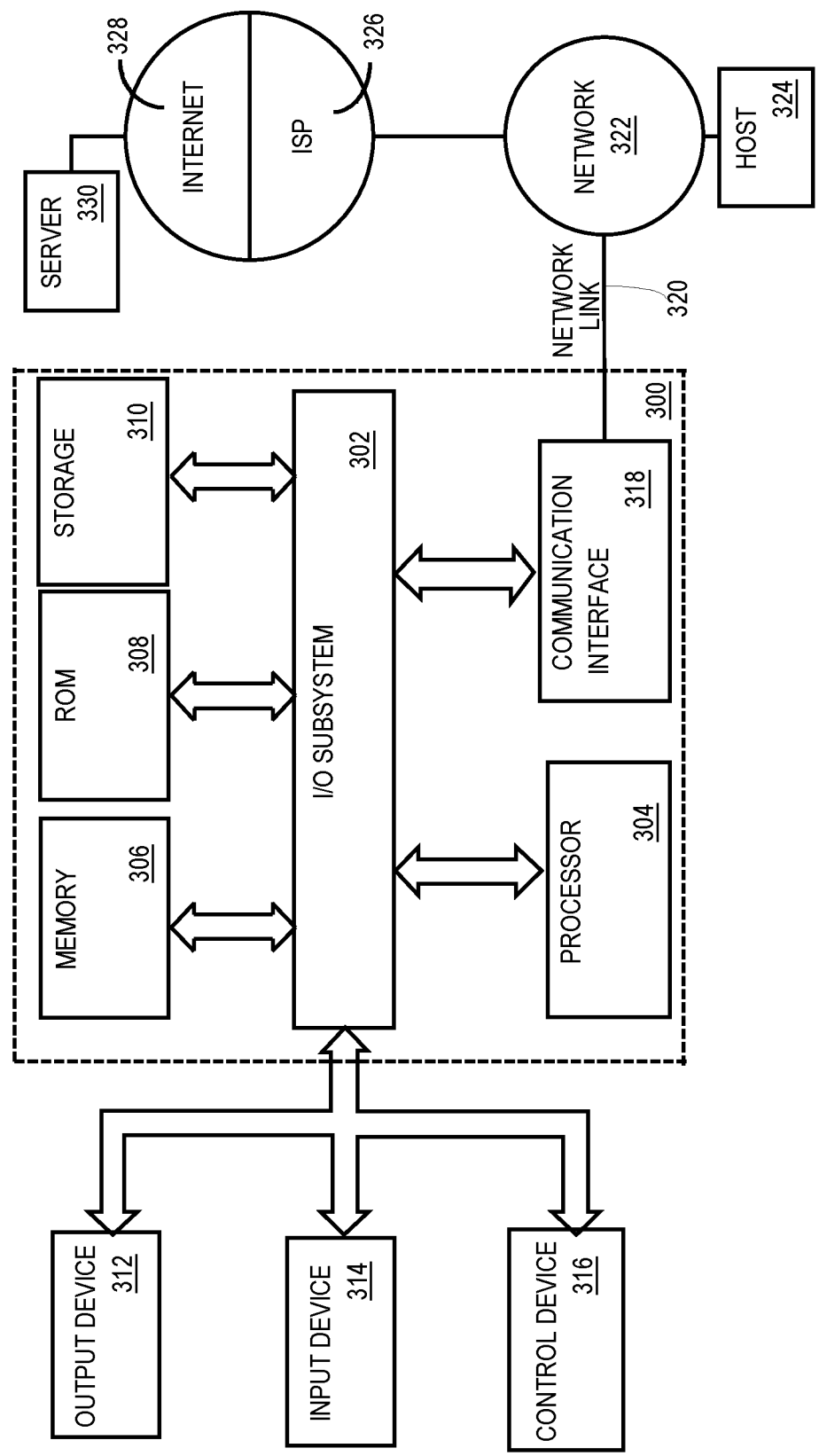
FIG. 3 illustrates an example computer system, according to an embodiment.

FIG. 3 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

5.0 Graphical User Interface Implementations

FIG. 4A, FIG. 4B, FIG. 4C, FIG. 4D, FIG. 4E, FIG. 4F illustrate example graphical user interface displays, according to an embodiment.

Figure 4B:
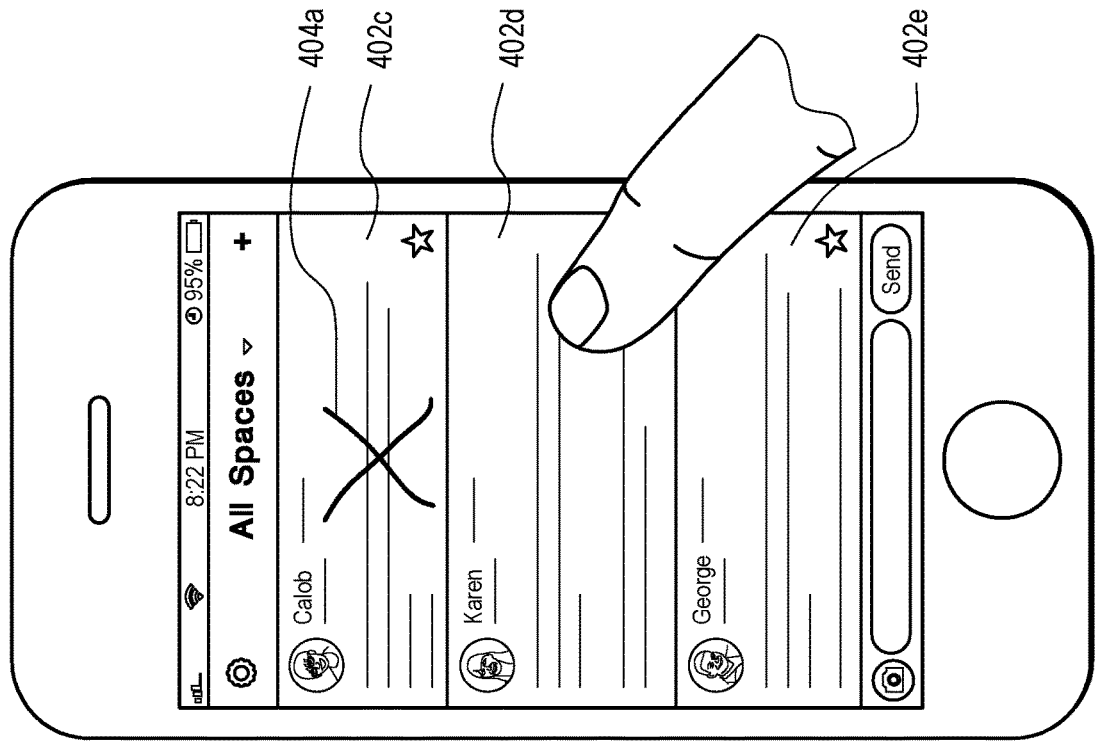
FIG. 4A, FIG. 4B, FIG. 4C, FIG. 4D, FIG. 4E, FIG. 4F illustrate example graphical user interface displays, according to an embodiment.
Figure 4A:
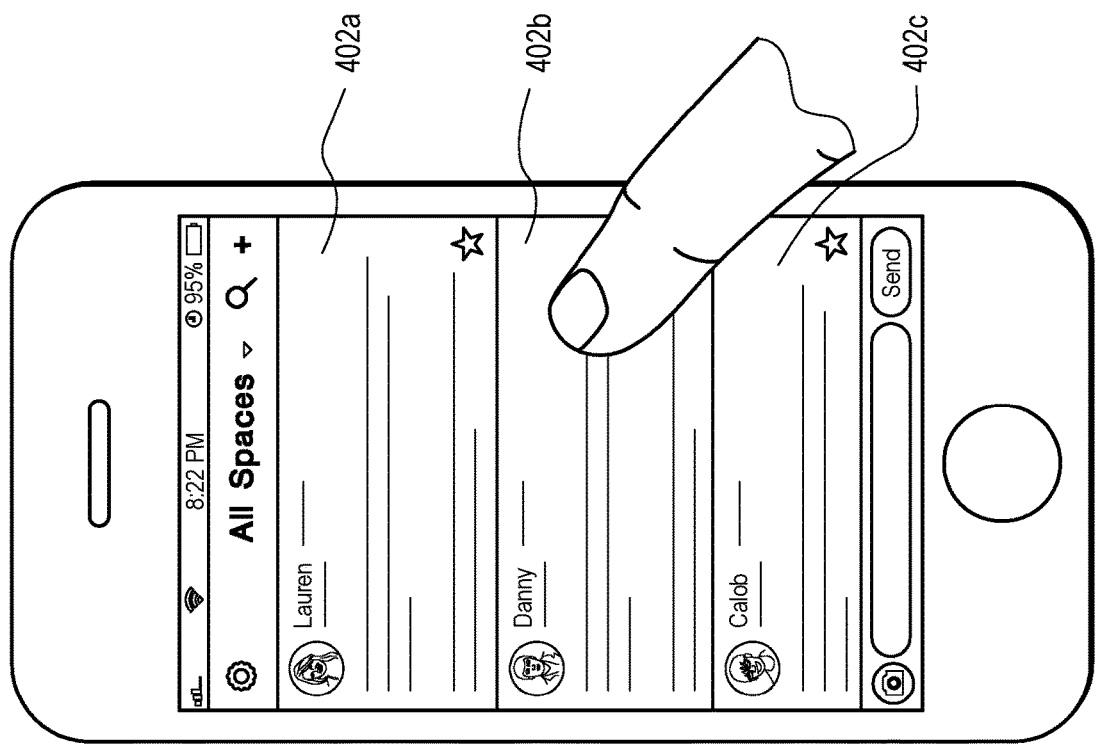

FIG. 4A illustrates a mobile computing device showing a display, by an application program, of a stream or feed of content items for a particular user account that is interacting with the application program. For purposes of illustrating a clear example, the application program may be a business collaboration communication system, such as CONFLUENCE from Atlassian Pty Ltd., Sydney, Australia, but any application program may be used in other embodiments. A visible portion of the stream illustrated in FIG. 4A includes actionable content items 402a, 402b, 402c. Actionable content items may be separated by bar lines.

FIG. 4B illustrates the screen display of FIG. 4A, scrolled up partially such that the visible portion of the stream includes actionable content items 402c, 402d, 402e. An X signaling gesture 404a has been input on the content item 402c via touch input using a touchscreen of the mobile computing device and finger touch, a stylus, pen or wand. In response, the application program has displayed an X gesture 404a superimposed over the content item 402c.

Figure 4C:
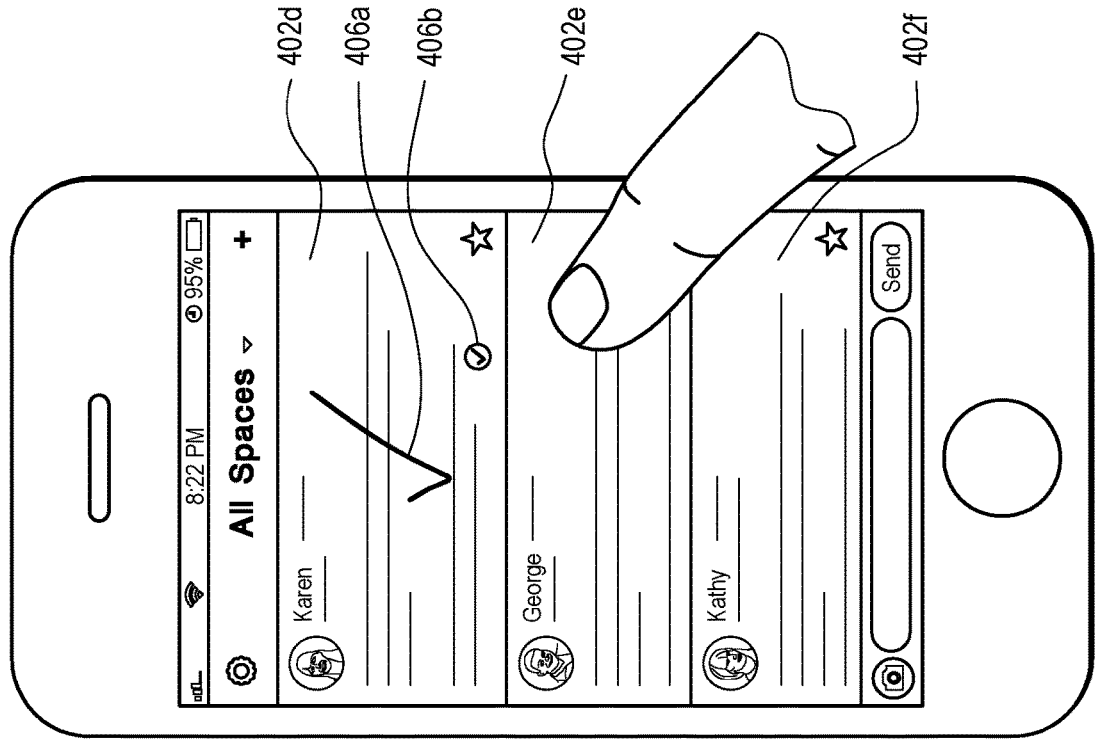

FIG. 4C illustrates the screen display of FIG. 4B, scrolled up partially but still showing actionable content items 402c, 402d, 402e. In FIG. 4C, the X signaling gesture 404a of FIG. 4B has been transformed, by the application program, into a graphical X icon 404b that appears at the bottom of the content item 402c that was shown in FIG. 4B. In an embodiment, the content item 402 may be later removed from the stream after a predetermined amount of time. Furthermore, FIG. 4C shows that a signaling gesture 406a for a check-mark has been received and graphically displayed over the content item 402d.

Figure 4D:
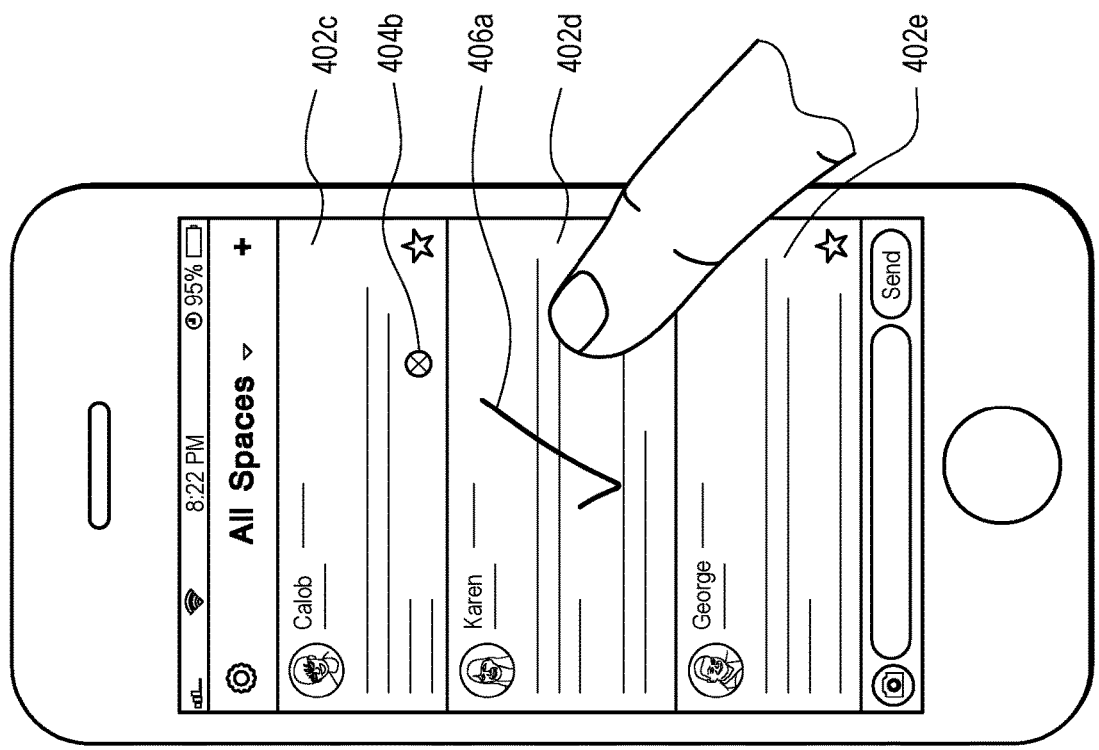

FIG. 4D illustrates the screen display of FIG. 4C scrolled up partially such that the visible portion of the stream includes actionable content items 402d, 402e, 402f. In FIG. 4D, the check-mark signaling gesture 406a of FIG. 4C has been transformed, by the application program, into a graphical check-mark icon 406b that appears at the bottom of the content item 402d that was shown in FIG. 4C. In an embodiment, signaling gestures, such as the check-mark signaling gesture 406a, may remain displayed for a predetermined amount of time after a corresponding graphical icon appears. In FIG. 4D, the check-mark signaling gesture 406a remains displayed.

Figure 4F:
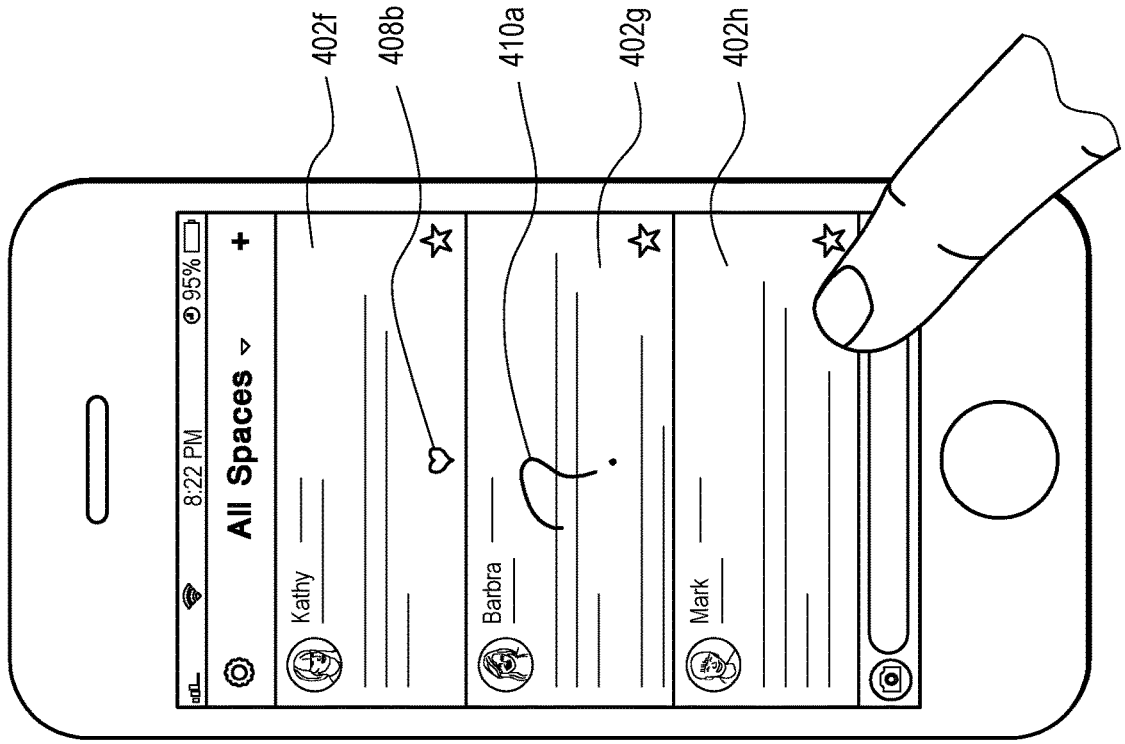
Figure 4E:
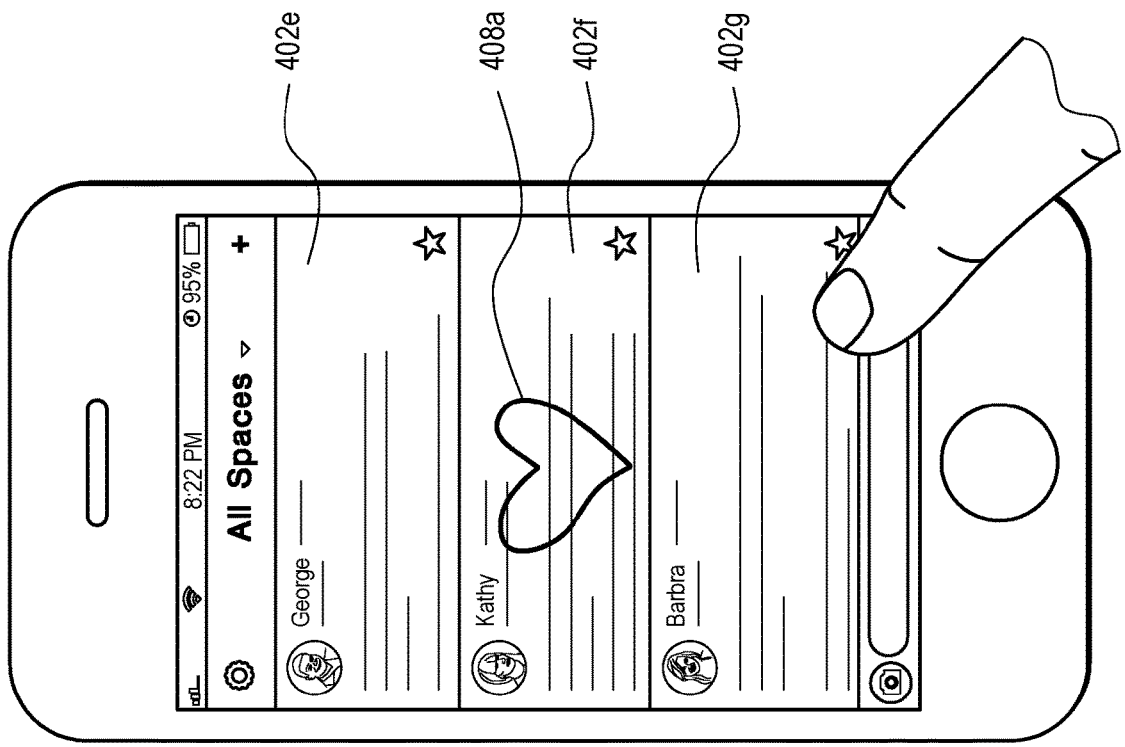

FIG. 4E illustrates the screen display of FIG. 4D scrolled up partially such that the visible portion of the stream includes actionable content items 402e, 402f, 402g. FIG. 4E shows that a heart symbol signaling gesture 408a has been entered and displayed over the actionable content item 402f.

FIG. 4F illustrates the screen display of FIG. 4E, scrolled up partially such that the visible portion of the stream includes actionable content items 402f, 402g, 402h. In FIG. 4F, the heart signaling gesture 408a of FIG. 4E has been transformed, by the application program, into a graphical heart icon 408b that appears at the bottom of the content item 402f that was shown in FIG. 4E. In FIG. 4F, the hart signaling gesture 408a is no longer displayed. Furthermore, FIG. 4F shows that a question-mark signaling gesture 410a has been received and graphically displayed over the content item 402g. The question-mark signaling gesture 410a is then transformed, by the application program, into a communication request with a user account associated with the actionable content item 402g.

It should be appreciated that specific actions executed for content items may vary from application to application and the foregoing are intended merely as examples.

Using the foregoing techniques, a change between modes, such as between a control mode and a signal mode, may be automatically recognized. Previously, a distinct or dedicated menu, a button, a toggle, a switch, or a change feature, that is separate from content, was used to signal a change between interacting in the control mode and interacting in the signal mode. Since display real estate on mobile computing devices is expensive, the present approach eliminates the use of such buttons, toggles, switches, or change features, advantageously leaving an entire display area available for content. Thus, the approaches disclosed herein improves efficiency of mobile computing device displays.

6.0 Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method comprising:
displaying a continuous content stream of individually actionable content items;
automatically recognizing, while the continuous content stream is being displayed, a mode change from a control mode to a signal mode by receiving a touch input and determining whether a start of the touch input is within a predetermined distance from a starting point predefined for a display view;
in response to the mode change, using a neural network to generate output data indicating a gesture classification for the touch input, wherein the touch input is received in relation to a particular actionable content item that is in a visible portion of the continuous content stream;
performing, according to the output data, an action for the particular actionable content item, the action comprising causing to render a graphical icon corresponding to the touch input in the continuous content stream at a location associated with the particular actionable content item;
wherein the method is performed by one or more computing devices.

2. The computer-implemented method of claim 1, wherein the individually actionable content items in the continuous content stream are from a plurality of data sources and are for a particular user account.

3. The computer-implemented method of claim 1, wherein the control mode enables interaction with display controls and the signal mode enables interaction with at least one of the individually actionable content items.

4. The computer-implemented method of claim 1, wherein the action is selected from a group comprising:
associating a dismissal indication with the particular actionable content item;
associating an approval indication with the particular actionable content item;
associating a strong approval indication with the particular actionable content item;
requesting communication with a user account associated with the particular actionable content item.

5. The computer-implemented method of claim 1, further comprising recognizing a control gesture while concurrently recognizing a signaling gesture that is interleaved with instances of the control gesture and performing a particular action in response to the signaling gesture.

6. The computer-implemented method of claim 1, further comprising classifying a plurality of different signaling gestures.

7. The computer-implemented method of claim 1, further comprising providing a visual indication that the mode change is recognized.

8. The computer-implemented method of claim 1, further comprising implementing a first logical layer of touch screen gestures relating to control gestures to control display aspects while concurrently recognizing a second logical layer of touch screen gestures relating to signaling gestures that interact with the individually actionable content items.

9. A computer-implemented system comprising:
a mobile device comprising a touchscreen and a first non-transitory data storage medium storing a first set of instructions which, when executed by the mobile device, cause:
displaying, on the touchscreen, a continuous content stream of individually actionable content items;
automatically recognizing, while the continuous content stream is being displayed on the touchscreen, a mode change from a control mode to a signal mode, by receiving a touch input and determining whether a start of the touch input is within a predetermined distance from a starting point predefined for a display view;
in response to the mode change, using a neural network to generate output data indicating a gesture classification for the touch input, wherein the touch input is received in relation to a particular actionable content item that is in a visible portion of the continuous content stream;
a server device comprising a second non-transitory data storage medium storing a second set of instructions which, when executed by the server device, cause:
performing, according to the output data, an action for the particular actionable content item, the action comprising causing to render, on the touchscreen, a graphical icon corresponding to the touch input in the continuous content stream at a location associated with the particular actionable content item.

10. The computer-implemented system of claim 9, wherein the individually actionable content items in the continuous content stream are from a plurality of data sources and are for a particular user account.

11. The computer-implemented system of claim 9, wherein the control mode enables interaction with display controls and the signal mode enables interaction with at least one of the individually actionable content items.

12. The computer-implemented system of claim 9, wherein the action is selected from a group comprising:
associating a dismissal indication with the particular actionable content item;
associating an approval indication with the particular actionable content item;
associating a strong approval indication with the particular actionable content item;
requesting communication with a user account associated with the particular actionable content item.

13. The computer-implemented system of claim 9, wherein the first set of instructions, when executed by the mobile device, further cause recognizing a control gesture while concurrently recognizing a signaling gesture that is interleaved with instances of the control gesture, and wherein the second set of instructions, when executed by the server device, further cause performing a particular action in response to the signaling gesture.

14. The computer-implemented system of claim 9, wherein the second set of instructions, when executed by the server device, further cause classifying a plurality of different signaling gestures.

15. The computer-implemented system of claim 9, wherein the second set of instructions, when executed by the server device, further cause providing a visual indication that the mode change is recognized.

16. The computer-implemented system of claim 9, wherein the first set of instructions, when executed by the mobile device, further cause implementing a first logical layer of touch screen gestures relating to control gestures to control display aspects while concurrently recognizing a second logical layer of touch screen gestures relating to signaling gestures that interact with the individually actionable content items.

* * * * *